L. WILLIS AND O. F. WOODWORTH.
SEED PLANTER.
APPLICATION FILED OCT. 30, 1917.
1,327,455.
Patented Jan. 6, 1920.
2 SHEETS—SHEET 1.
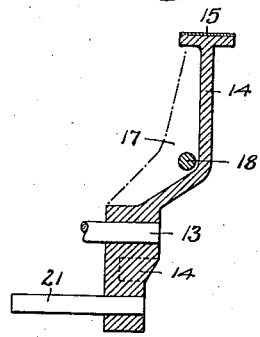
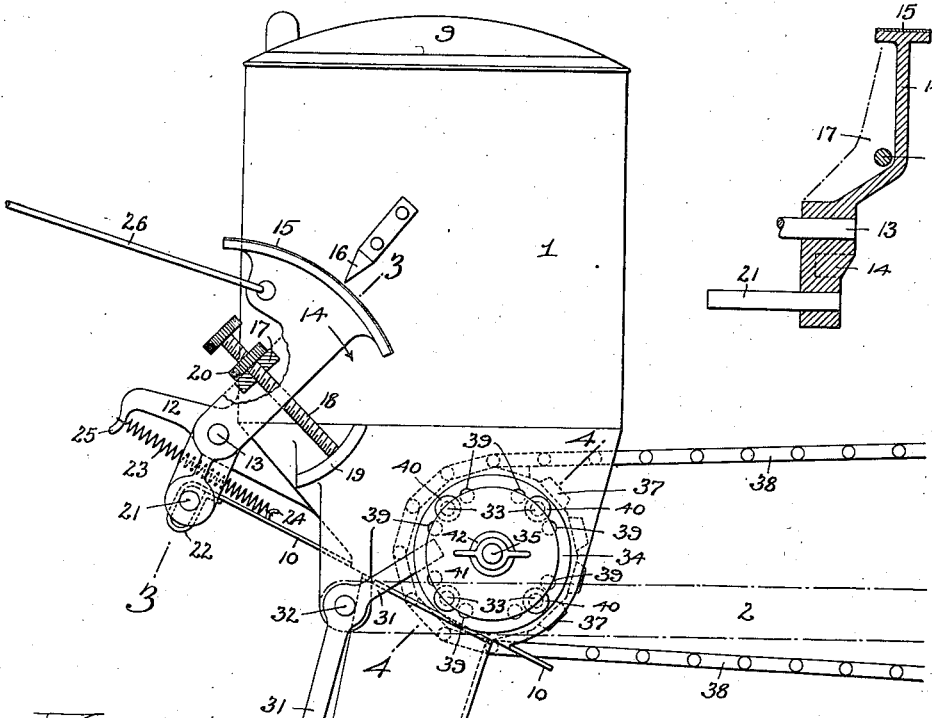
INVENTORS
LELAND WILLIS
AND
OLIN F. WOODWORTH
BY THEIR ATTORNEY Harry Smith

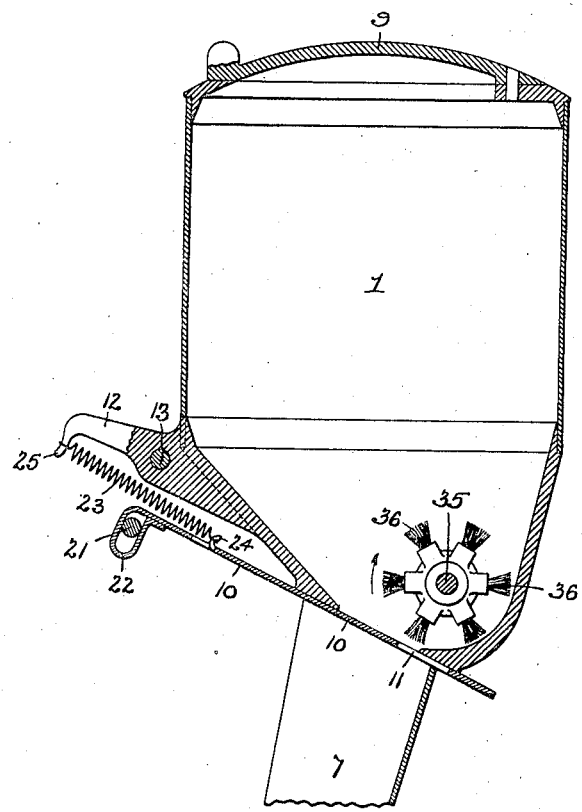
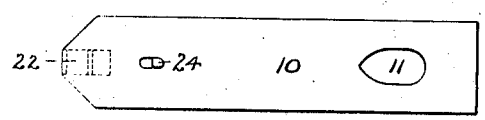
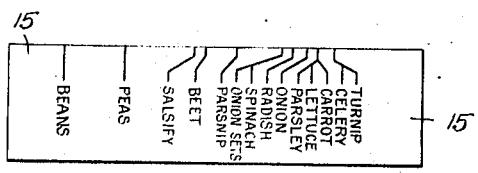

UNITED STATES PATENT OFFICE.

LELAND WILLIS AND OLIN F. WOODWORTH, OF GRENLOCH, NEW JERSEY, ASSIGNORS TO BATEMAN MANUFACTURING COMPANY, OF GRENLOCH, NEW JERSEY, A CORPORATION OF NEW JERSEY.

SEED-PLANTER.

1,327,455.

Specification of Letters Patent.    Patented Jan. 6, 1920.

Application filed October 30, 1917. Serial No. 199,270.

*To all whom it may concern:*

Be it known that we, LELAND WILLIS and OLIN F. WOODWORTH, citizens of the United States, residing in Grenloch, New Jersey, have invented certain Improvements in Seed-Planters, of which the following is a specification.

One of the objects of our invention is to prevent jamming of seeds in the lower portion of the seed hopper, and a further object is to provide simple and efficient means for insuring the proper readjustment of the feed regulating valve after it has been fully closed in order to check the discharge of seed at the end of a row.

These objects we attain in the manner hereinafter set forth, reference being had to the accompanying drawings, in which—

Figure 1 is a view partly in side elevation and partly in section of sufficient of a seed planting machine to illustrate our present invention;

Fig. 2 is a vertical section through the seed hopper and upper part of the feed chute;

Fig. 3 is a transverse section of part of the machine on the line 3—3, Fig. 1;

Fig. 4 is a transverse section of another part of the machine on the line 4—4, Fig. 1;

Fig. 5 is a top view of the feed regulating valve, and

Fig. 6 is a top view, on a larger scale, of the plate for indicating the proper adjustment of the regulating valve for different sizes of seed.

In the drawing, 1 represents the seed hopper which is fixedly mounted upon a fixed member 2 of the machine, and has at the bottom an opening through which it communicates with the upper end of a depending feed chute 7, the latter usually carrying, at its lower end, a furrow-forming plow 8, vertically adjustable on the feed chute so as to determine the depth of the furrow.

The seed hopper 1 is closed at the top by a swinging cap 9, and has at the bottom guides for the opposite edges of a downwardly inclined feed regulating valve 10 in which is formed a slot 11 for the passage of the seed, this slot being tapered at its inner end, as shown in Fig. 5, so that by adjustment of the valve the area of the opening for the discharge of seed may be readily varied to accord with the character of the seed which is being planted.

Projecting from the rear of the seed hopper is an arm 12, from which projects a pin 13, and upon the latter is pivotally mounted a lever 14, the long arm of this lever having a segmental end on which is mounted an indicator plate 15, co-acting with a fixed toe 16 on the side of the hopper to indicate the proper adjustment of the lever for different kinds of seed. A lug 17 on the long arm of the lever 14 carries a set screw 18 whose forward end contacts with a segmental rib 19 on the side of the hopper and serves to arrest the movement of the lever 14 in the direction of the arrow, Fig. 1, a jam nut 20 on said set screw bearing upon the lug 17 and serving to lock the said screw in position when it has once been properly adjusted. The short arm of the lever 14 has a projecting pin 21 which engages a loop 22 on the valve 10 and thereby serves to cause movement of said valve with said short arm of the lever in either direction.

A spring 23, connected at one end to a hook 24 on the valve and at the other end to a toe 25 on the arm 12 tends to retract said valve and to constantly move the lever 14 in the direction of the arrow, Fig. 1, and thereby cause the set screw 18 to bear upon the stop rib 19.

A cord or wire 26 is connected to the lever 14, the upper end of this cord or wire, in practice, extending to such a point as to be within convenient reach of the attendant, who can, therefore, when the end of a row is reached, readily move the lever 14 in a direction opposite to that indicated by the arrow, so as to thrust forward the valve 10 and thus carry the slot 11 in the latter forwardly beyond the forward edge of the opening in the bottom of the hopper in order to cut off further feed of seed at the end of a row, the spring 23 restoring the valve to its normal position again as soon as tension upon the cord or wire 26 is released.

The feed chute 7 has, near the bottom, a stop valve 27 pivotally mounted upon a transverse pin 28 on the feed chute and normally held in the position shown in Fig. 1 by means of a spring 29. The valve 27 has, however, a curved arm 30 upon which bears one arm of a lever 31 which is pivoted to a projecting pin 32 on the side of the hopper and has another arm adapted to be acted upon by pins 33 adapted to openings in a disk 34 which is secured to and rotates with a shaft 35, the latter passing transversely through the lower portion of the hopper and being provided, inside of said hopper, with a rotary brush 36, as shown in Fig. 2.

On that end of the shaft 35 opposite to the one which carries the disk 34, is fixedly mounted a sprocket wheel 37, driven in any suitable manner, as, for instance, by a sprocket chain 38 (Fig. 1) from the supporting wheel or other available rotating member of the machine, so that as the machine moves forwardly the brush 36 will be rotated in the direction of the arrow shown in Fig. 2. A rotary brush has before been used in machines of this type, and we therefore make no claim for the same broadly considered, but in our machine the brush bears a certain relation to the lower portion of the hopper and to the valve 10 which is novel and attains a certain useful result which we will now proceed to describe:

The bristle tufts of the brush sweep downwardly with their outer ends in contact with or closely adjacent to the inner face of the curved front wall of the lower portion of the hopper, as shown in Fig. 2. The axis of the brush shaft is in advance of the forward edge of the delivery opening in the bottom of the hopper, hence when a tuft of bristles swings rearwardly past said edge, and over the opening 11 in the valve, it is also rising, and therefore has no tendency to jam the seeds in the contracted rear end of said opening 11, or between the tuft and the upper face of the valve, free delivery of the successive bunches of seed into the upper end of the feed chute 7 being thus insured until all of the contents of the hopper have been discharged.

The seeds thus delivered to the chute 7 drop through the same until their fall is arrested by the stop valve 27, the latter being opened at intervals so as to permit discharge of the accumulated seeds into the furrow at the bottom of the chute. Periodical opening movement of the valve 27 is effected by contact of the pins 33 on the disk 34 with the short arm of the lever 31, such action causing the long arm of said lever to the position of the pins 33 on the disk 34 said pins are retained in position by clamping a head 40 on each pin between the outer face of the disk 34 and a resilient retainer plate 41, the latter bearing upon the heads of the series of pins and being caused to press upon them by means of a thumb nut 42 which bears upon the outer face of the plate and is screwed upon the threaded outer end of the shaft 35, as shown in Fig. 4.

We claim:

1. The combination, in a seed planter, of the seed hopper having a delivery opening in the bottom, a forwardly and downwardly inclined and slotted valve for regulating the delivery of seeds through said opening, a rotary brush in the lower portion of the hopper for feeding the seeds to said valve, said brush having its axis above and in advance of the forward edge of the opening in the bottom of the hopper, and means for rotating said brush in such a direction that the outer end of the tuft will swing rearwardly over the valve while also rising so as to prevent said tuft from jamming seeds in the rear end of the slot in the valve or between the tuft and the upper face of said valve.

2. The combination, in a seed planter, of the seed hopper having a delivery opening in the bottom, a forwardly and downwardly inclined and slotted valve for regulating the delivery of seeds through said opening, a rotary brush in the lower portion of the hopper for feeding seeds to said valve, said brush having its axis so disposed above and in advance of the forward edge of the opening in the bottom of the hopper that the outer ends of the successive tufts of bristles will travel in contact with or in close proximity to the adjacent wall of the hopper, and means for rotating said brush in such a direction that the outer end of the tuft will swing rearwardly over the valve while also rising so as to prevent said tuft from jamming seeds in the rear end of the slot in the valve or between the tuft and the upper face of said valve.

3. The combination of the seed hopper having a delivery opening in the bottom, a slotted valve for regulating the discharge of